(12) United States Patent
Brittingham

(10) Patent No.: US 8,057,186 B2
(45) Date of Patent: Nov. 15, 2011

(54) SHAPE FOR A TURBINE BUCKET TIP SHROUD

(75) Inventor: Robert A. Brittingham, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 876 days.

(21) Appl. No.: 12/107,249

(22) Filed: Apr. 22, 2008

(65) Prior Publication Data

US 2009/0263248 A1 Oct. 22, 2009

(51) Int. Cl.
*F01D 5/22* (2006.01)
(52) U.S. Cl. ............... 416/189; 416/191; 416/223 A
(58) Field of Classification Search ........... 416/189, 416/191, 223 A, 243
See application file for complete search history.

(56) References Cited

U.S. PATENT DOCUMENTS

| 7,887,295 | B2* | 2/2011 | Brittingham et al. | 416/189 |
|---|---|---|---|---|
| 2005/0013692 | A1* | 1/2005 | Snook et al. | 416/191 |
| 2005/0036890 | A1* | 2/2005 | Tomberg et al. | 416/192 |
| 2005/0106025 | A1* | 5/2005 | Snook et al. | 416/189 |
| 2009/0053047 | A1* | 2/2009 | Chiurato et al. | 415/173.1 |
| 2009/0136347 | A1* | 5/2009 | Brittingham et al. | 416/179 |

* cited by examiner

*Primary Examiner* — Igor Kershteyn
(74) *Attorney, Agent, or Firm* — Mark E. Henderson; Ernest G. Cusick; Frank A. Landfraff

(57) ABSTRACT

A turbine bucket that may include an airfoil having a tip shroud, the tip shroud having an edge; wherein the edge has a profile substantially in accordance with values of X and Y in a Cartesian coordinate system set forth in Table 1 at points 1-14, wherein X and Y represent distances that may be proportionally scaled by a common multiplier which, once scaled and connected, define the profile of the edge of the tip shroud.

20 Claims, 4 Drawing Sheets

SHAPE FOR A TURBINE BUCKET TIP SHROUD

BACKGROUND OF THE INVENTION

The present invention relates to turbine buckets having an airfoil and a tip shroud carried by the airfoil. More specifically, the present invention relates to edge profiles for a tip shroud.

Turbine buckets typically comprise an airfoil, a platform, a shank and a dovetail. In operation, the dovetail is secured in a complementary slot in a turbine wheel. On many airfoils, integral tip shrouds are used on the outer radial end of the airfoil to create an outer surface of the passage through which the hot gasses must pass. Having the tip shroud as a part of the airfoil typically increases the efficiency of the turbine engine. Moreover, in general, larger tip shrouds enhance engine performance more than smaller ones. As such, in one respect, it is desirable to have the entire outer radial surface of the airfoil covered by a relatively large tip shroud.

During operation, tip shrouds become highly stressed because of the mechanical forces applied to them via the rotational velocity of the turbine engine. The high temperature environment of the turbine coupled with the high stress level quickens the rate at which these parts deform, which shortens their useful life. As a result, it is desirable that tip shroud remain relatively small and light-weight such that operational stresses are reduced. A common practice is to remove certain portions of the tip shroud such that its weight and the resulting operational stresses are reduced while also keeping intact significant portions of the tip shroud profile for the sake of engine performance. When designing tip shrouds, finding the proper balance between these competing objectives—i.e., extended useful part life and efficient engine performance—is a challenge. As such, there is a continuing need for tip shroud edge profiles that effectively meet these dual goals.

BRIEF DESCRIPTION OF THE INVENTION

The present application thus describes a turbine bucket that may include an airfoil having a tip shroud, the tip shroud having an edge; wherein the edge has a profile substantially in accordance with values of X and Y in a Cartesian coordinate system set forth in Table 1 at points 1-14, wherein X and Y represent distances that may be proportionally scaled by a common multiplier which, once scaled and connected, define the profile of the edge of the tip shroud.

The present application further describes a turbine bucket that may include an airfoil having a tip shroud, the tip shroud having an edge; wherein the edge has a profile substantially in accordance with values of X and Y and Z in a Cartesian coordinate system set forth in Table 1 at points 1-14, wherein X and Y and Z are distances in inches which, when the points are connected by smooth, continuing arcs, define the profile of the edge of the tip shroud.

The present application further describes a tip shroud for a turbine bucket, the tip shroud may include a leading edge and a trailing edge, wherein the profile of the leading edge is defined substantially in accordance with values of X and Y in a Cartesian coordinate system at points 1-14 as set forth in Table 1, wherein the X and Y values are distances in inches which, when the points are connected by smooth, continuing arcs, define the profile of the leading edge of the tip shroud.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
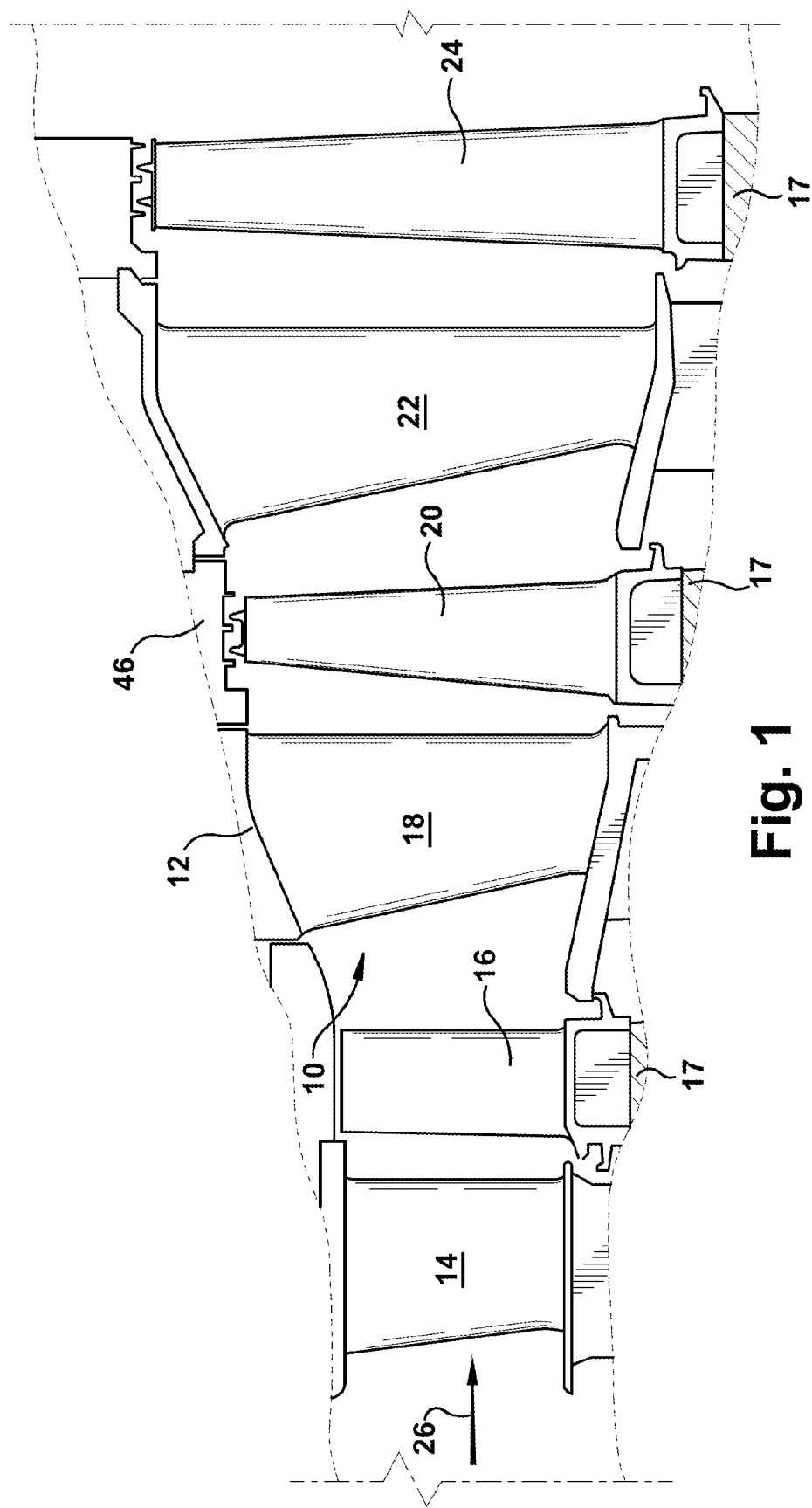
FIG. 1 is a schematic representation of a hot gas path through multiple stages of a gas turbine and illustrates an exemplary turbine in which an embodiment of the present invention may operate.

Referring now to the figures, FIG. 1 illustrates a hot gas path, generally designated 10, of a gas turbine 12 that includes a plurality of turbine stages. Three stages are illustrated. A first stage may include a plurality of circumferentially spaced nozzles 14 and turbine buckets or buckets 16. The first stage nozzles 14 generally are circumferentially spaced one from the other and fixed about the axis of the rotor (not shown). The first stage buckets 16 may be mounted on a turbine wheel 17 for rotation about the rotor when hot gases are expanded through the hot gas path 10. A second stage of the turbine 12 is also illustrated. The second stage similarly may include a plurality of circumferentially spaced nozzles 18 and a plurality of circumferentially spaced buckets 20 mounted on a turbine wheel 17. A third stage also is illustrated and includes a plurality of circumferentially spaced nozzles 22 and buckets 24 mounted on a turbine wheel 17. It will be appreciated that the nozzles and buckets lie in the hot gas path 10 of the turbine 12, the direction of flow of the hot gas through the hot gas path 10 being indicated by the arrow 26.

Figure 2:
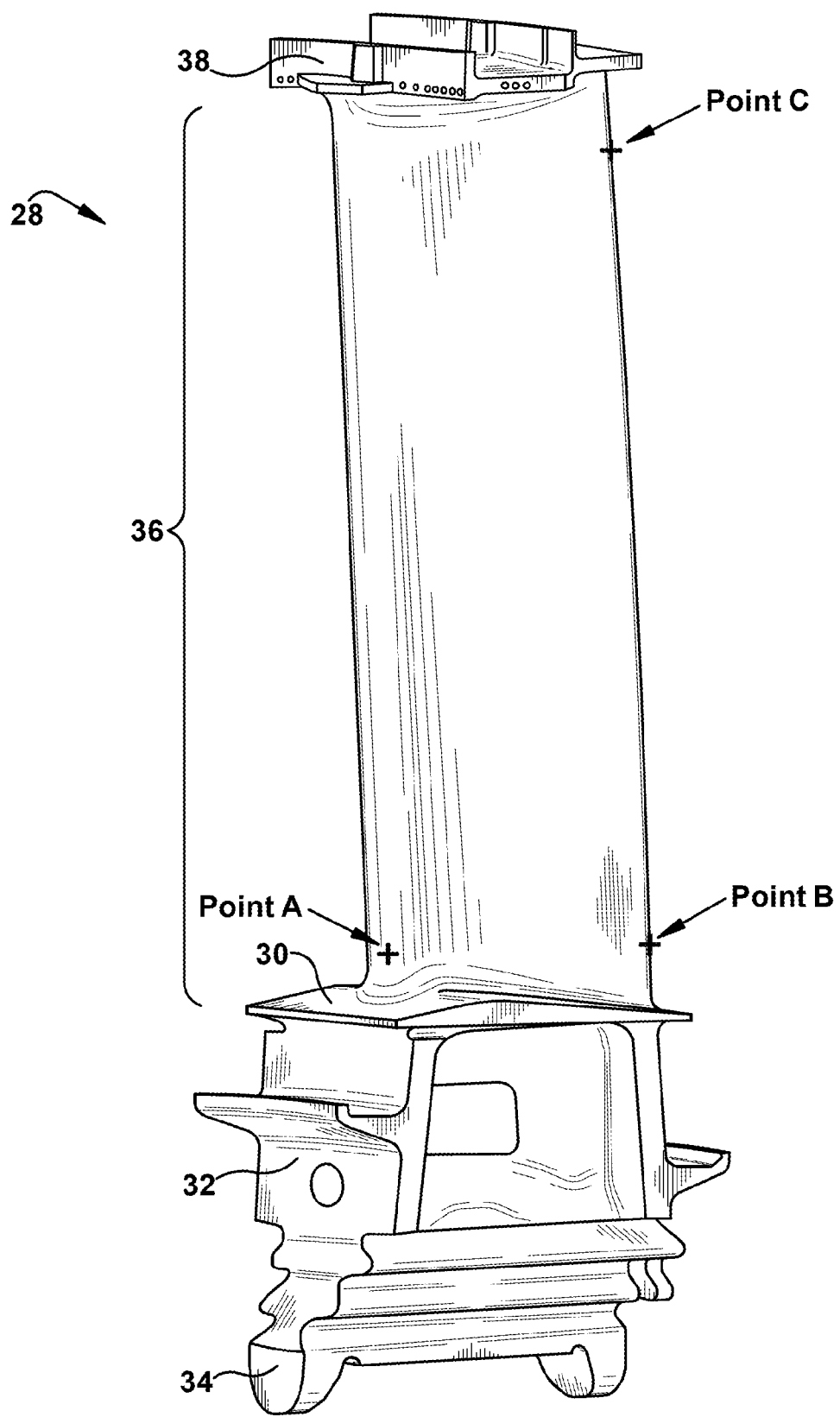
FIG. 2 is a perspective view of an exemplary conventional turbine bucket on which an embodiment of the present invention may operate.
Figure 3:
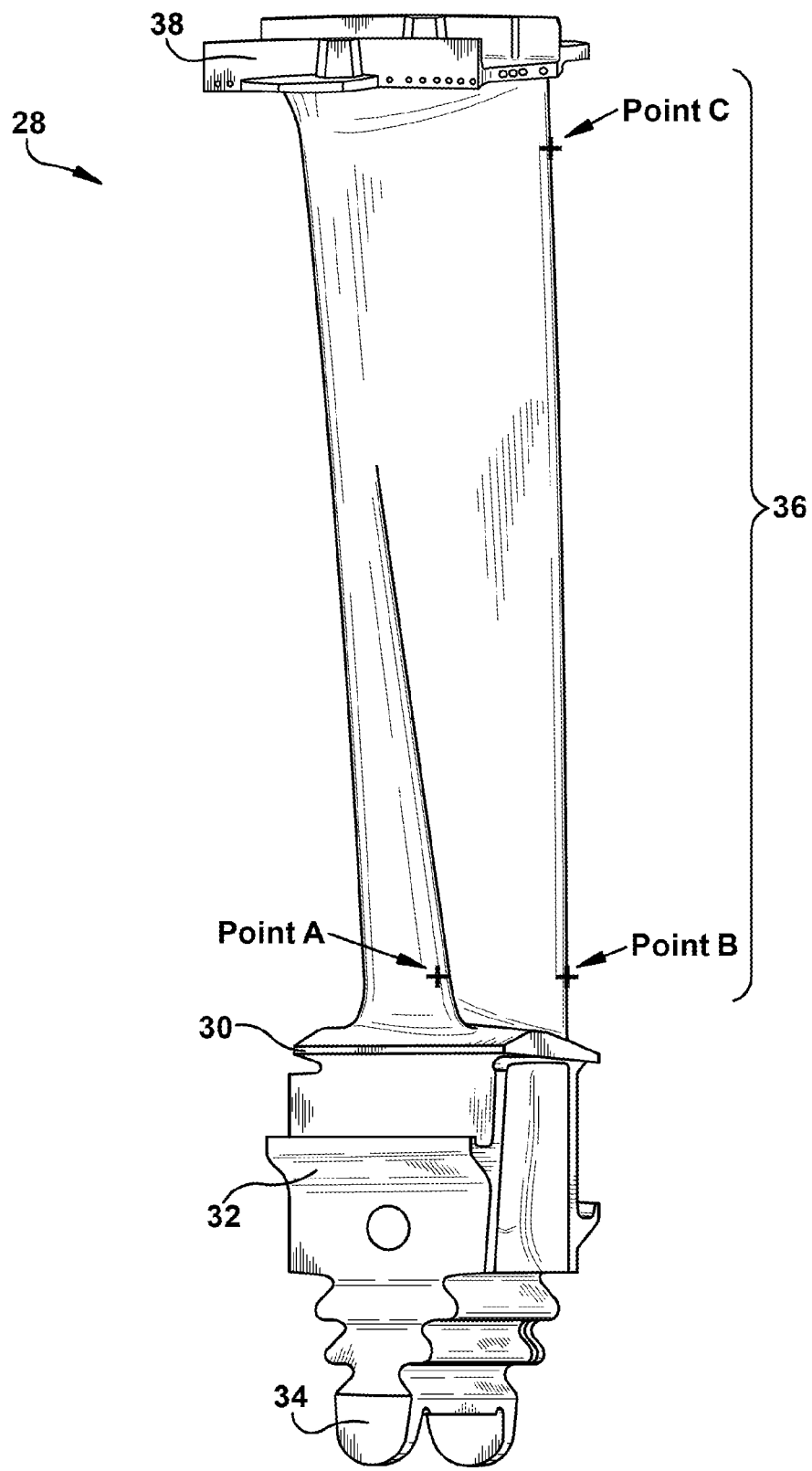
FIG. 3 is an alternative perspective view of the turbine bucket of FIG. 2.

As one of ordinary skill in the art will appreciate, a conventional turbine bucket, generally indicated in FIGS. 2 and 3 as 28, typically includes a platform 30, a shank 32, and a dovetail 34, which is used to connect the bucket to a turbine wheel (not shown). Turbine bucket 28 also includes a bucket airfoil or airfoil 36 that generally resides along the middle length of the bucket 28. Along the airfoil 36, the bucket 28 generally has a cross-sectional shape of an airfoil. Because of this shape, during operation, the flow of the hot gases induces the bucket stage to rotate about the rotor such that the energy of the expanding hot gases is converted into the mechanical energy of the rotating rotor.

As further illustrated in FIGS. 2 and 3, the turbine bucket 28 also includes a conventional tip shroud 38. The tip shroud 38, which generally is formed as an integral part of the bucket 28 at the outer radial end of the airfoil 36, provides a surface area that runs substantially perpendicular to the airfoil surface such that it caps or covers the tip of the airfoil. During operation, the tip shroud 38 engages at opposite ends the two adjacent tip shrouds of the adjacent buckets such that an approximate annular ring or shroud circumscribing the hot gas path at the location of the stage of buckets is formed. This annular ring holds the expanding gases of the hot path on the airfoil (i.e., it does not allow the gases to slide over the end of the airfoil blade) so that a greater percentage of energy from the working fluid may be converted into mechanical energy by the turbine blades. Tip shrouds, thusly, generally improve the performance of gas turbine engines.

Typically, in terms of engine performance, it is desirable to have relatively large tip shrouds such that each adequately covers the entire outer radial end of the airfoil. As one of ordinary skill in the art will appreciate, during operation, tip shrouds become highly stressed due to their overhung load and rotational velocity of the turbine engine. These stresses coupled with the high temperature environment of the turbine quicken the rate at which creep causes the turbine buckets to deform, which, of course, shortens the useful life of these parts. As a result, in terms of furthering the life of the turbine buckets, it is desirable that tip shrouds remain relatively small and light-weight. Given these competing objectives, i.e., part-life versus engine performance, a common practice is to remove certain portions of the tip shroud (often termed "scalloping the tip shroud") such that the weight and overhung load of the tip shroud are reduced, which results in a reduction in operational stresses, while also maintaining intact significant portions of tip shroud for the sake of engine performance.

Figure 4:
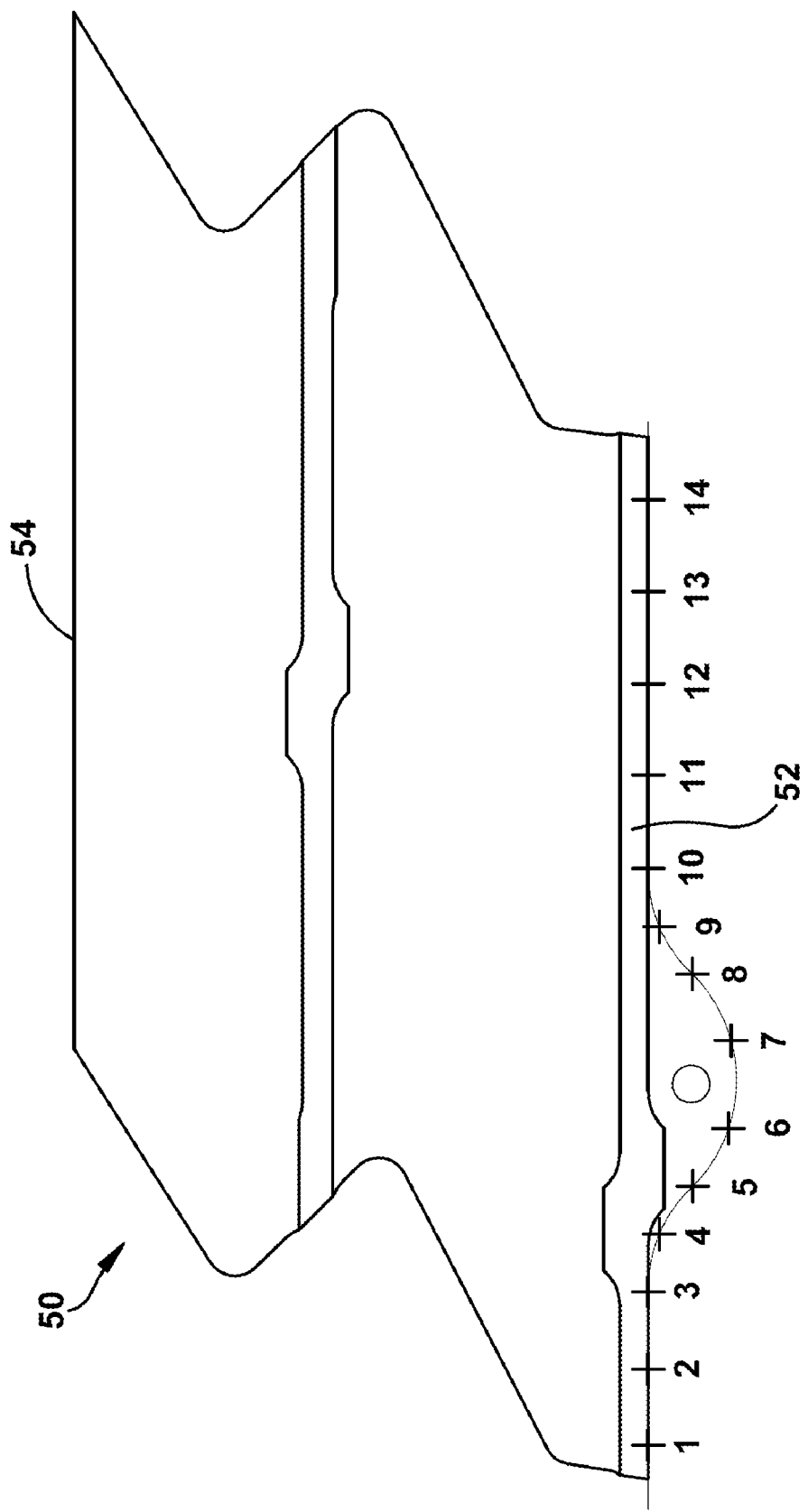
FIG. 4 is a top view of a tip shroud that incorporates on one edge a profile according to an exemplary embodiment of the present invention.

FIG. 4 illustrates a top view of a tip shroud 50 according to an exemplary embodiment of the present application. As one of ordinary skill in the art will appreciate, the tip shroud 50 includes leading and trailing edges 52 and 54, respectively. That is, the edges 52 and 54 lie on opposite axial facing sides of the tip shroud 50 in the hot gas path, with the leading edge 52 generally faces upstream and the trailing edge 54 generally faces downstream. Also illustrated in FIG. 4 are a number of points, numbered 1 through 14, which define an edge profile of the tip shroud 50 according to an exemplary embodiment of the present application, which is discussed in greater detail below. Note that FIG. 4 shows the edge profile (i.e., points 1 through 14) as located on the leading edge 52 of the tip shroud. This is exemplary. One of ordinary skill in the art will appreciate that, in some embodiments, the edge profile delineated by points 1 through 14 may be located on both the leading edge 52 and the trailing edge 54 of the tip shroud 50 or only on the trailing edge 54. Further, the exemplary embodiment of FIG. 4 is primarily discussed in terms of its function on tip shrouds in a gas turbine engines. One of ordinary skill in the art will appreciate that other functions are possible, such as using scaled versions in steam turbine or aircraft engines.

More specifically, though it is not so limited, in some embodiments, the exemplary embodiment of FIG. 4 may be used as a tip shroud on a second stage bucket in a gas turbine engine. Further, though it is not so limited, the exemplary embodiment of FIG. 4 in some embodiments may be used as a tip shroud in a 7FA+e Gas Turbine Engine manufactured by The General Electric Company ("GE") of Schenectady, N.Y. Finally, though it is not so limited, in other embodiments, the exemplary embodiment of FIG. 4 may be used as a tip shroud on a second stage bucket in a 7FA+e Gas Turbine Engine manufactured by The General Electric Company ("GE") of Schenectady, N.Y.

To define the shape of the tip shroud edge profile according to an exemplary embodiment of the present application, a unique set or loci of points in space may be delineated. As shown in Table 1 below and as indicated on FIG. 4, the loci that defines a tip shroud edge profile according to the current application may include a set of 14 points with X, Y and Z coordinates relative to the origin coordinate system. More specifically, as one of ordinary skill in the art will appreciate, the coordinate system is set relative to the airfoil and is fully defined by points A, B and C as shown on FIGS. 2 and 3. Points A and B may both be located approximately 39.600 inches above the cold rotor center line. Point A may lie at the intersection of the airfoil mean camber line and the leading-edge airfoil surface. Point B may lie at the intersection of the airfoil mean camber line and the trailing-edge airfoil surface.

Point C may be located 49.862 inches above the cold rotor center line and lies at the intersection of the airfoil mean camber line and the airfoil trailing-edge surface. The coordinate system origin may be located at point A. Points A and B may define the positive X-axis. Points A, B and C may define the positive X-Z plane. The Y-axis may then be defined using the right-hand rule methodology.

As stated, the Cartesian coordinate system of X, Y and Z values given in Table 1 below may define the profile of the leading edge 52 of the tip shroud 50 according to an embodiment of the present application. More specifically, the profile of the leading edge 52 may be defined by the points listed such that the profile of the leading edge 52 can be constructed by defining approximately smooth continuing arcs through the listed points. The coordinate values for the X, Y and Z coordinates are set forth in inches in Table 1, although other units of dimensions may be used if the values are appropriately converted.

Further, as one of ordinary skill in the art will appreciate, Table 1 coordinate values are generated and shown to three decimal places for determining the profile of the leading edge 52 of the tip shroud 50. These points represent the nominal cold or room temperature shape of the edge. As the tip shroud heats up in operation, mechanical loading and temperature will cause a change in X, Y and Z coordinates. Accordingly, values for the airfoil shape given in Table 1 represent ambient, non-operating or non-hot conditions. Further, there are typical manufacturing and coating tolerances that must be accounted for in the actual profile of the airfoil shape. It will therefore be appreciated that +/− typical manufacturing tolerances, i.e., +/− values, including any coating thickness, are additive to the X and Y values given in Table 1 below. Accordingly, a distance of +/−0.064 inches in a direction normal to the edge defined by the points 1-14 may define the exemplary profile of the leading edge 52 in accordance with the embodiment of Table 1. Thus, a variation within the tolerance value (i.e., +/−0.064 inches) between measured points on the profile of the leading edge 52 at nominal cold or room temperature and the ideal position of these points as given in the table below at the same temperature may exist. The edge profile is robust to this range of variation without impairment of mechanical function. (In addition, as one of ordinary skill in the art will appreciate, a greater tolerance range may be applicable when certain types of modifications are made to the tip shroud 50 once the part has reached the location of the turbine. Such local modification—sometimes referred to as "local blending"—may be done, for example, by a technician with a hand grinder that may be used to grind away a defect or by similar methods. When taking into account these type of local modifications, an additional tolerance value of approximately +/−0.020 inches may be used. That is, when local blending or other similar local modification practice is performed, the edge profile generally is robust to an extended tolerance range (i.e., +/−0.084 inches) without impairment of mechanical function.)

The coordinates of Table 1 are as follows:

TABLE 1

| Point # | X (in) | Y (in) | Z (in) |
| --- | --- | --- | --- |
| 1 | −0.288 | 3.315 | 10.883 |
| 2 | −0.179 | 3.084 | 10.891 |
| 3 | −0.069 | 2.852 | 10.898 |
| 4 | −0.022 | 2.665 | 10.904 |
| 5 | −0.050 | 2.474 | 10.911 |
| 6 | −0.075 | 2.251 | 10.918 |
| 7 | 0.039 | 1.987 | 10.926 |

TABLE 1-continued

| Point # | X (in) | Y (in) | Z (in) |
|---|---|---|---|
| 8 | 0.249 | 1.840 | 10.931 |
| 9 | 0.413 | 1.739 | 10.934 |
| 10 | 0.527 | 1.584 | 10.939 |
| 11 | 0.656 | 1.311 | 10.948 |
| 12 | 0.785 | 1.037 | 10.957 |
| 13 | 0.913 | 0.764 | 10.966 |
| 14 | 1.042 | 0.491 | 10.974 |

One of ordinary skill in the art will appreciate that the tip shroud edge profile disclosed in the above Table 1 above may be scaled up or down geometrically for use in other turbine stages or types of turbines, including use in steam turbine or aircraft engine. Consequently, the coordinate values set forth in Table 1 may be scaled upwardly or downwardly such that the airfoil shape remains proportionally unchanged. The scaled version of the coordinates in Table 1 would be represented by X, Y and Z coordinate values of Table 1 with X and Y and Z coordinates multiplied or divided by a constant number. Further, one of ordinary skill in the art will appreciate that the Z coordinates in Table 1 are provided, though, as the values of Table 1 indicate, the edge profile of the tip shroud is substantially constant in the Z direction. Given this, it will further be appreciated that the claimed edge profile, in some embodiments, may be defined as a two-dimensional shape defined by the X and Y coordinates of Table 1 at a substantially constant Z coordinate value. That is, the edge of the tip shroud is located at a substantially constant radial distance from the rotor.

As described above, in terms of engine performance, it is generally desirable to have relatively large tip shrouds such that adequately cover or shroud the entire outer radial end of the airfoil. However, during operation, this overhung load generally becomes very highly stressed due to the rotational velocity of the turbine engine. These stresses coupled with the high temperature environment of the turbine may shorten the part life of the turbine buckets. As a result, in terms of furthering the life of the turbine buckets with integral tip shrouds, it is desirable that tip shrouds remain relatively small and light-weight.

The tip shroud shape according to the present invention effectively balances these competing objectives such that both part-life and engine performance goals may be satisfied. That is, the tip shroud shape of the present invention provides a profile that effectively covers the tip of the airfoil while maintaining operation stresses at acceptable levels. In addition, the tip shroud shape according to the present application provides for other operational efficiencies, including, for example, stage airflow efficiency, enhanced aeromechanics, reduced thermal stresses, and reduced mechanical stresses when compared to other conventional tip shroud shapes. As one of ordinary skill in the art will appreciate, the effectiveness of the tip shroud shape according to the present invention may be verified by computational fluid dynamics (CFD); traditional fluid dynamics analysis; Euler and Navier-Stokes equations; for transfer functions, algorithms, manufacturing: manual positioning, flow testing (for example in wind tunnels), and modification of the tip shroud; in-situ testing; modeling: application of scientific principles to design or develop tip shrouds, machines, apparatus, or manufacturing processes; tip shroud flow testing and modification; combinations thereof, and other design processes and practices. These methods of determination are merely exemplary, and are not intended to limit the invention in any manner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A turbine bucket including an airfoil having a tip shroud, the tip shroud having an edge;
   wherein the edge has a profile substantially in accordance with values of X and Y in a Cartesian coordinate system set forth in Table 1 at points 1-14, wherein X and Y represent distances that may be proportionally scaled by a common multiplier which, once scaled and connected, define the profile of the edge of the tip shroud.

2. The turbine bucket according to claim 1, wherein X and Y values of Table 1 are distances in inches which, when connected by smooth, continuing arcs, define the profile of the edge of the tip shroud.

3. The turbine bucket according to claim 1, wherein the profile of the edge lies in an envelope within +/−0.064 inches in a direction normal to any location along the edge.

4. The turbine bucket according to claim 1, wherein the profile of the edge lies in an envelope within +/−0.084 inches in a direction normal to any location along the edge.

5. The turbine bucket according to claim 1, wherein the edge comprises a leading edge of the tip shroud of the turbine bucket.

6. The turbine bucket according to claim 1, wherein the edge comprises a trailing edge of the tip shroud of the turbine bucket.

7. The turbine bucket according to claim 1, wherein the edge comprises a leading edge and a trailing edge of the tip shroud of the turbine bucket.

8. The turbine bucket according to claim 1, wherein the turbine bucket is configured to operate as a second stage turbine bucket in a gas turbine engine.

9. A turbine bucket including an airfoil having a tip shroud, the tip shroud having an edge;
   wherein the edge has a profile substantially in accordance with values of X and Y and Z in a Cartesian coordinate system set forth in Table 1 at points 1-14, wherein X and Y and Z are distances in inches which, when the points are connected by smooth, continuing arcs, define the profile of the edge of the tip shroud.

10. The turbine bucket according to claim 9, wherein profile of the edge lies in an envelope within +/−0.064 inches in a direction normal to any location along the edge.

11. The turbine bucket according to claim 9, wherein the X and Y and Z values set forth in Table 1 are scalable as a function of the same number to provide a scaled-up or scaled-down profile of the edge of the tip shroud.

12. The turbine bucket according to claim 9, wherein the edge comprises a leading edge of the tip shroud of the turbine bucket.

13. The turbine bucket according to claim 9, wherein the edge comprises a trailing edge of the tip shroud of the turbine bucket.

14. The turbine bucket according to claim 9, wherein the turbine bucket is configured to operate as a second stage turbine bucket in a gas turbine engine.

15. The turbine bucket according to claim 9, wherein the profile of the edge lies in an envelope within +/−0.084 inches in a direction normal to any location along the edge.

16. A tip shroud for a turbine bucket, the tip shroud having a leading edge and a trailing edge, wherein the profile of the leading edge is defined substantially in accordance with values of X and Y in a Cartesian coordinate system at points 1-14 as set forth in Table 1, wherein the X and Y values are distances in inches which, when the points are connected by smooth, continuing arcs, define the profile of the leading edge of the tip shroud.

17. The tip shroud according to claim 16, wherein the profile of the leading edge lies in an envelope within +/−0.064 inches in a direction normal to any location along the edge.

18. The turbine bucket according to claim 16, wherein the X and Y and Z values set forth in Table 1 are scalable as a function of the same number to provide a scaled-up or scaled-down profile of the edge of the tip shroud.

19. The turbine bucket according to claim 16, wherein the edge comprises a leading edge of the tip shroud of the turbine bucket.

20. The turbine bucket according to claim 16, wherein the edge comprises a trailing edge of the tip shroud of the turbine bucket.

* * * * *